United States Patent
Schultz (10) Patent No.: US 12,397,700 B2
(45) Date of Patent: Aug. 26, 2025

(54) MODULAR SWINGING WALL ASSEMBLY USED TO CREATE SEPARATE SPACES IN A VEHICLE OR TRAILER

(71) Applicant: Justin Michael Schultz, Greensboro, NC (US)

(72) Inventor: Justin Michael Schultz, Greensboro, NC (US)

( * ) Notice: Subject to any disclaimer, the term of this patent is extended or adjusted under 35 U.S.C. 154(b) by 412 days.

(21) Appl. No.: 18/063,796

(22) Filed: Dec. 9, 2022

(65) Prior Publication Data

US 2023/0191979 A1    Jun. 22, 2023

Related U.S. Application Data

(60) Provisional application No. 63/265,638, filed on Dec. 17, 2021.

(51) Int. Cl.
*B60P 3/34* (2006.01)
*E05D 15/48* (2006.01)

(52) U.S. Cl.
CPC .............. *B60P 3/34* (2013.01); *E05D 15/48* (2013.01); *E05D 2015/485* (2013.01); *E05Y 2900/512* (2013.01)

(58) Field of Classification Search
CPC ..... E05D 15/48; E05D 2015/485; B60P 3/34; E05Y 2900/512
See application file for complete search history.

(56) References Cited

U.S. PATENT DOCUMENTS

| | | | |
|---|---|---|---|
| 2,681,016 A | 6/1954 | Candlin, Jr. | |
| 3,640,445 A | 2/1972 | Durham | |
| 4,761,922 A * | 8/1988 | Black | E04B 2/74 52/745.11 |
| 5,129,235 A | 7/1992 | Renken et al. | |
| 5,423,463 A | 6/1995 | Weeks | |
| 5,820,187 A | 10/1998 | Ament et al. | |
| 6,634,691 B2 | 10/2003 | Henderson | |
| 6,719,347 B2 | 4/2004 | Gehring et al. | |
| 7,731,462 B2 | 6/2010 | Squyres et al. | |
| 7,871,229 B2 | 1/2011 | Haddad et al. | |
| 7,882,659 B2 * | 2/2011 | Gyory | E04B 1/3444 296/183.1 |
| 8,317,442 B2 | 11/2012 | Daikuzono | |
| 8,650,806 B1 * | 2/2014 | Condie | E04H 1/1205 52/79.5 |
| 8,834,083 B2 | 9/2014 | Nelson et al. | |
| 8,850,991 B2 | 10/2014 | Early et al. | |

(Continued)

*Primary Examiner* — Babajide A Demuren
(74) *Attorney, Agent, or Firm* — Dunlap Bennett & Ludwig, PLLC (57) ABSTRACT

A swing wall assembly is provided. The assembly may have a fixed wall attached to a supporting surface of the space. A geared hinge connects a swing wall to the fixed wall so that the swing wall may be offset from the supporting surface by a caster distance. A caster assembly may protrude from a lower portion of the swing wall by the caster distance so as to be moveable along the supporting surface. The swing wall may be connected to a header by way of a self-aligning lock. A sliding lock may connect the swing wall and or a pod wall that can be operatively associated with the swing wall opposite the fixed wall. The pod wall allows the swing wall assembly to selectively close off different types of spaced within an enclosed space of a recreational vehicle.

6 Claims, 9 Drawing Sheets

(56) References Cited

U.S. PATENT DOCUMENTS

| | | |
|---|---|---|
| 8,864,079 B2 | 10/2014 | Sankrithi |
| 9,932,143 B2 | 4/2018 | Henderson et al. |
| 10,358,173 B2 | 7/2019 | Gussen et al. |
| 11,014,487 B2 | 5/2021 | Loew et al. |
| 2002/0116878 A1* | 8/2002 | Ciotti .................... E04B 1/3442 52/79.5 |
| 2008/0131226 A1 | 6/2008 | Pesson |
| 2013/0291449 A1* | 11/2013 | Strickland ............. E04B 1/3442 52/79.5 |
| 2015/0315776 A1* | 11/2015 | Duncan ............... E04B 1/34384 52/66 |
| 2016/0082875 A1 | 3/2016 | Squyres |

\* cited by examiner

MODULAR SWINGING WALL ASSEMBLY USED TO CREATE SEPARATE SPACES IN A VEHICLE OR TRAILER

CROSS-REFERENCE TO RELATED APPLICATION

This application claims the benefit of priority of U.S. provisional application No. 63/265,638, filed Dec. 17, 2021, the contents of which are herein incorporated by reference.

BACKGROUND OF THE INVENTION

The present invention relates to vehicular interiors and, more particularly, a modular swinging wall assembly used to create separate spaces in a vehicle or trailer.

Commercial vehicles or trailers used for medical, dental, education, and marketing purposes often require segregated spaces for different activities and different people to maximize utility as well as ensure privacy and even safety during these multiple purposes. However, fixed interior walls prevent this optimization and otherwise frustrate selectively tailoring the use of the given space. For instance, fixed walls impede moving equipment moving in and out of the segregated spaces as well as hinder personnel transiting the space. Moreover, fixed walls or barriers prevent the conversion of the vehicle/trailer between a first module (say, an "event arrangement") to a second module (say, a "travel arrangement"). Which is why the recreation vehicle (RV) market affords moveable slide-out structures. However, what does a big-vehicle owner do if their vehicle does not come with adequate space-separation with or without slide-out structures?

Furthermore, other separating assemblies lack structural integrity and/or allow sound and air to easily flow around the barrier, again, frustrating some of the uses otherwise possible for the space afforded; examples include folding partitions, accordion doors, and other hinged door assemblies may be used to separate space in a vehicle or trailer. This is because folding partitions, accordion doors, and other hinged doors are designed to be "universal" temporary structures, and as a result lack structural integrity and are not adapted to form air-flow proof joints. This lack of structural integrity prohibits such partition framing a standard door. And some partitions, even hinged ones, are heavy, difficult, and dangerous to install and use, and none allow for installation at the slide-outs of RVs or specialty trailers.

In short, pre-existing space-segregation assemblies are too flimsy (curtains, accordion doors), while others are clunky (must be fit into place as panels) or dangerous to install—and none fit elegantly around the slide-outs of RVs or specialty trailers.

As can be seen, there is a need for a modular swinging wall assembly used to create separate interior spaces in large vehicles or trailers, affording a modularity in design not yet possible by the prior art.

SUMMARY OF THE INVENTION

The modular swinging wall assembly embodied in the present invention is constructed with distinguishing features crafted from lightweight materials: including a heavy-duty hinged edge to allow safe and balanced operation; locking mechanisms to secure the assembly in place both during use and in transit; and a leading-edge wheel assembly to prevent distortion over time, thereby enabling an inherent standard personnel door for transit within a sturdy frame that prevents air flow. The modular swinging wall assembly is sound and air-flow resistant and fits elegantly around slide-outs in RVs and specialty trailers.

The present invention is a particular type of swinging wall assembly that separates interior spaces ala a fixed wall assembly yet facilitates easy and reliable repositioning, enabling alternative unimpeded transits through the space as well as selectivity in re-installing alternative uses and functionality.

In some embodiments, the method of construction embodied in the present invention provides a more structurally sound, more reliable, and more aesthetically pleasing alternative to any other method of separating interior vehicular space while improving the ease and speed of setting up, tearing down, and re-making of alternative constructions.

In one aspect of the present invention, a swing wall assembly for a recreational vehicle, the swing wall assembly providing a fixed wall pivotably connected to a first edge of a swing wall by way of a geared hinge configured so that a bottom elevation is elevated a caster distance relative a bottom elevation of the fixed wall; and a caster assembly protruding from the bottom elevation of the swing wall.

In another aspect of the present invention, the swing wall assembly further provides a header connectable to an upper surface of the swing wall, wherein each end of the header comprises an angle portion, wherein the angle portions have an angle of incidence relative to a longitudinal axis the header of between fifteen to twenty-five degrees; further providing a self-aligning lock interconnecting the header and an upper portion of the swing wall; further providing a pod wall connectable to a second edge of the swing wall by way of one or more flanges; further providing a sliding lock connected to a bottom portion of the pod wall or the swing wall, wherein the sliding lock moves to a locked engagement with a supporting surface of the swing wall assembly; and further providing a doorway provided by the swing wall.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides a modular swinging wall assembly used to create separate spaces in a vehicle or trailer.

LIST OF COMPONENTS (1) fixed wall
(2) geared hinge
(3) relocatable partition wall
(4) wheel assembly connector
(5) wall header
(6) self-aligning lock
(7) relocatable partition wall flange
(8) pod wall flange
(9) pod wall
(10) sliding floor lock connector
(11) bottom lock base plate
(12) wheel of a caster assembly
(13) sliding locks Referring now to FIGS. 1 through 11, the present invention may include a modular swinging wall assembly 100 having a structural frame fabricated from lightweight structural tubing and flat bars (in certain embodiments, but not limited to, using aluminum components). The modular swinging wall assembly 100 framing may be covered (in certain embodiments, but not limited to, by ¼" plywood and wall finish, wallcovering, or the like) and have sliding locks fastened in place. The framing and frame covering are carefully assembled as shown in the drawing to produce a perfectly sized, well-balanced, and reliable assembly.

The modular swinging wall assembly 100 may include a fixed wall 1 pivotably connected to a swing wall 3 by way of a geared hinge 2 along a first edge 31 of the swing wall 3. The geared hinge 2 enables the installer to selectively offset a bottom elevation the swing wall 3 relative to a bottom elevation of the fixed wall 1. For instance, the bottom elevation of the fixed wall 1 may be at the upper elevation of the supporting surface, while the bottom elevation of the swing wall 3 may be approximately ⅞ of an inch from the supporting surface. A wall header 5 may spaced apart from an upper elevation of the swing wall 3.

Figure 1:
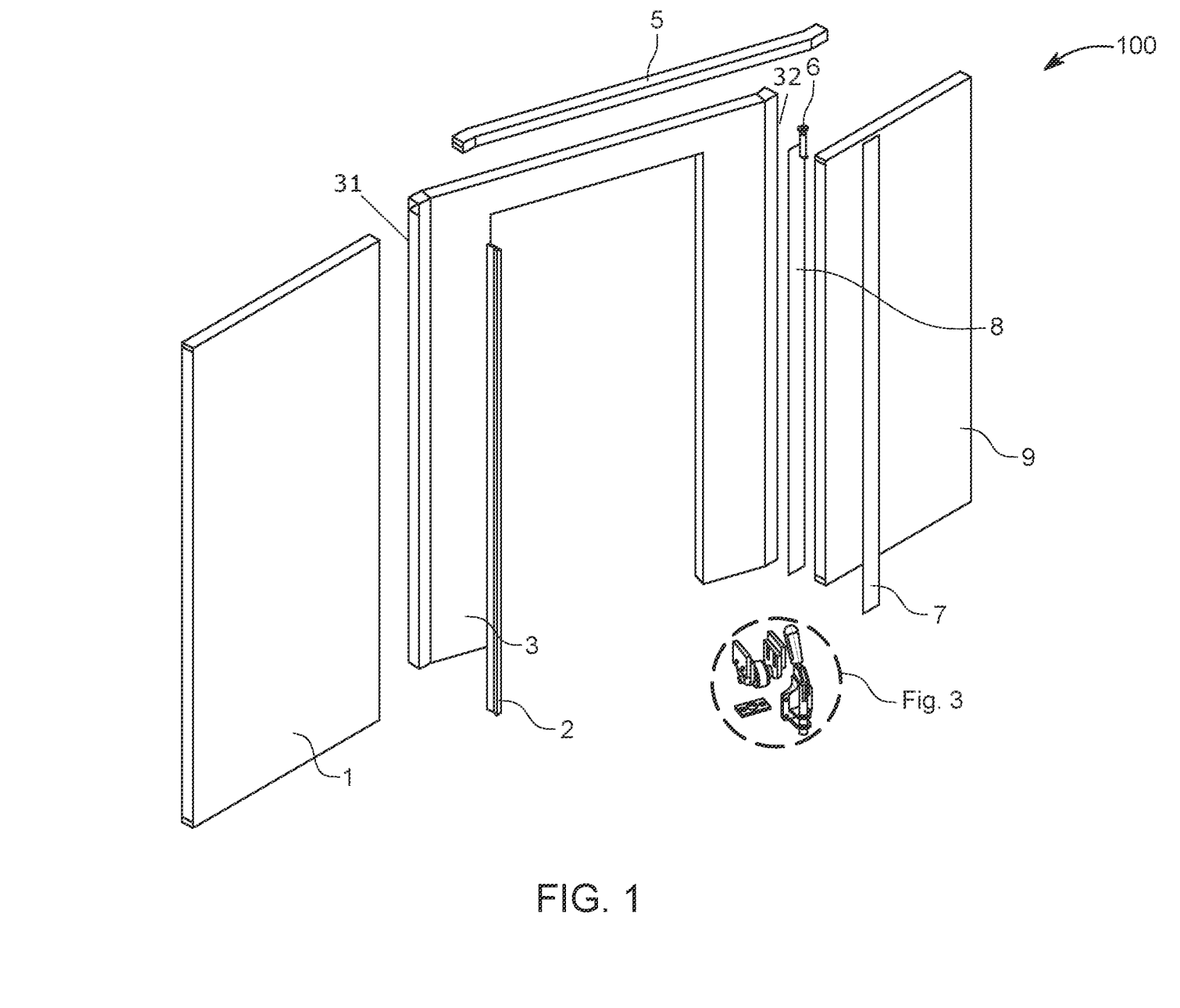
FIG. 1 is an exploded perspective view of an exemplary embodiment of the present invention.
Figure 2:
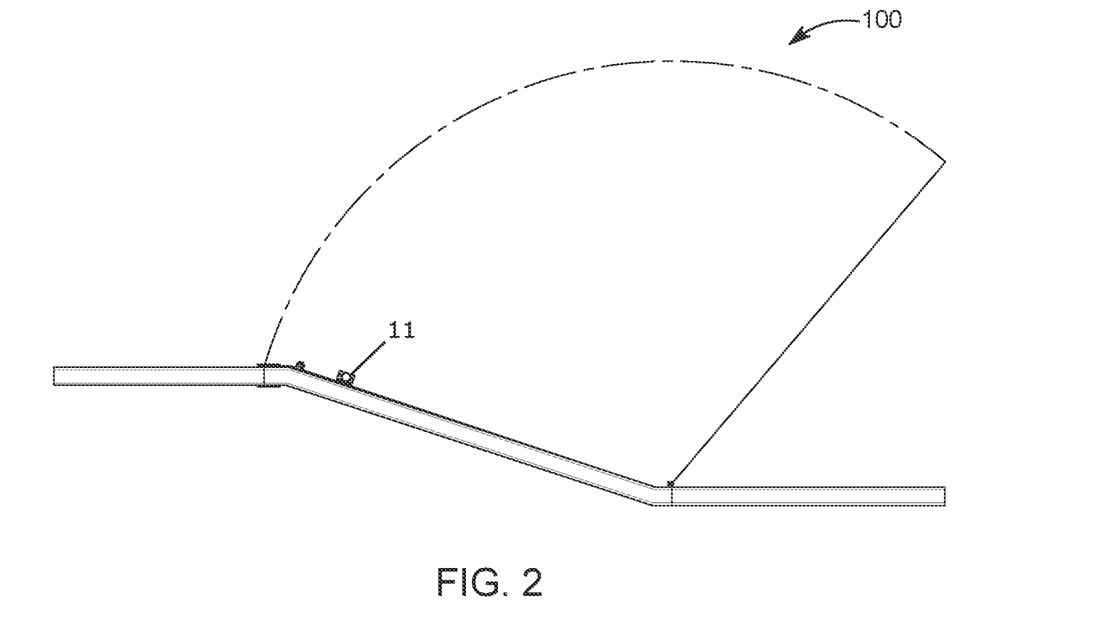
FIG. 2 is a top plan view of an exemplary embodiment of the present invention.
Figure 3:
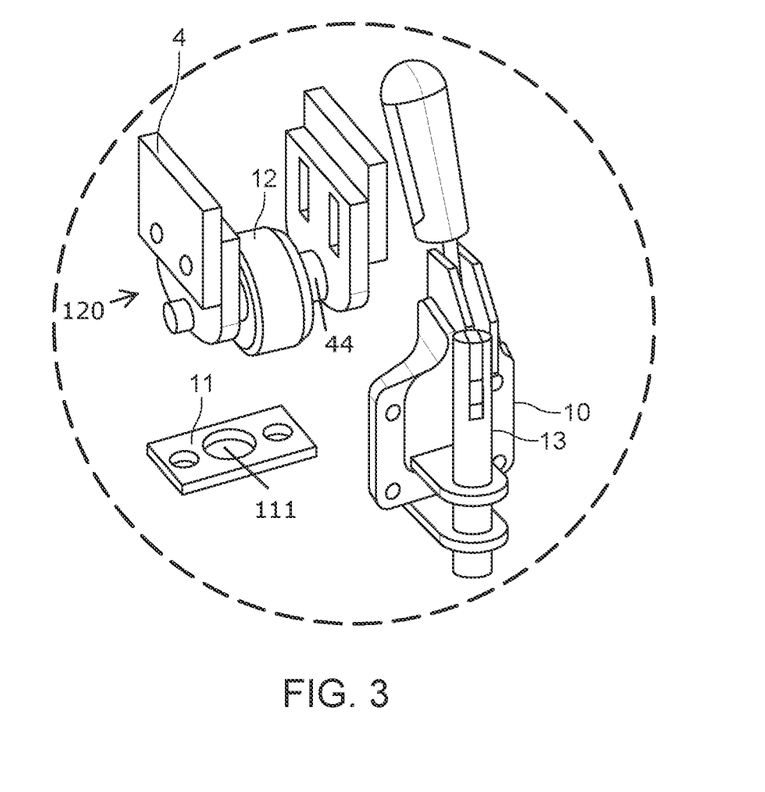
FIG. 3 is a detailed perspective view of an exemplary embodiment of the present invention.
Figure 4:
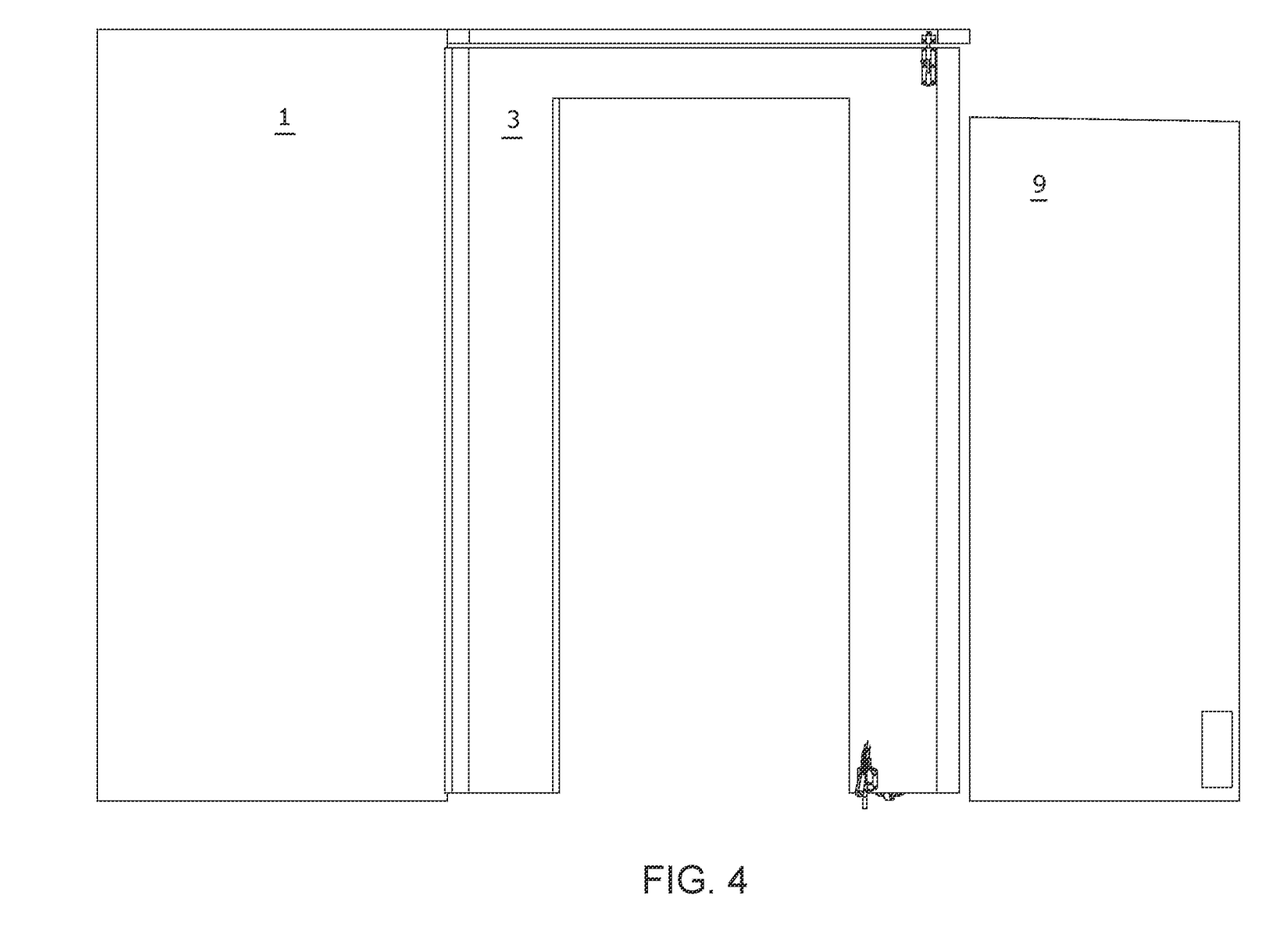
FIG. 4 is an elevation view of an exemplary embodiment of the swing wall assembly of the present invention.
Figure 5:
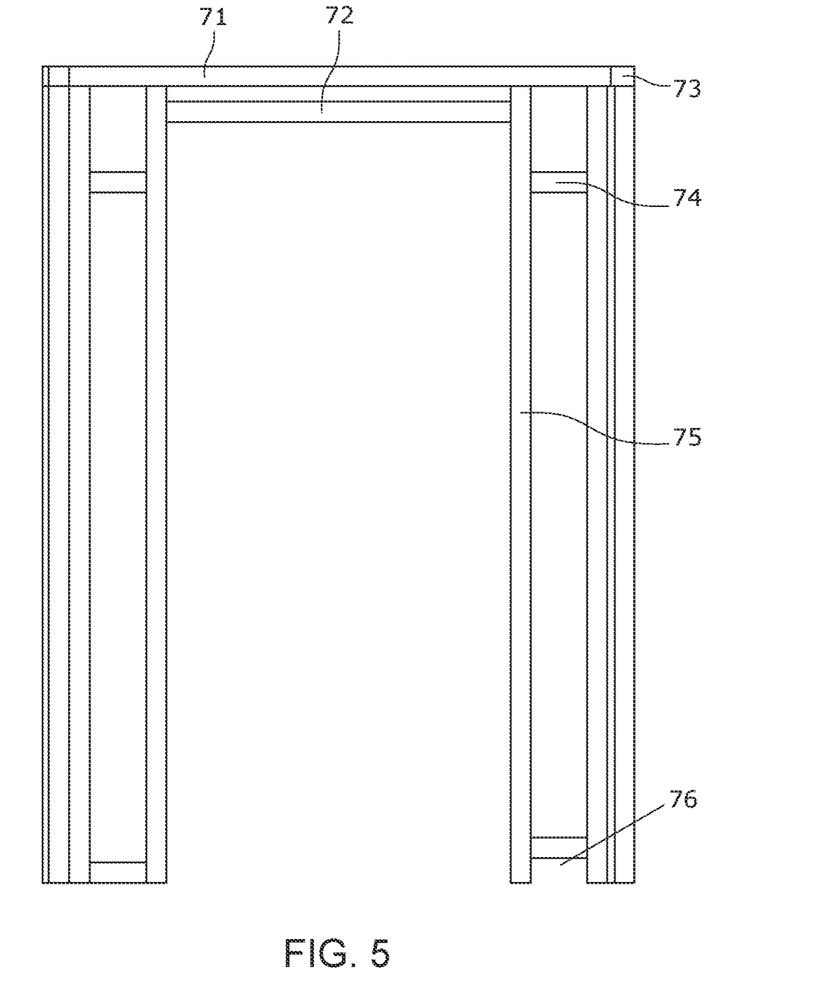
FIG. 5 is a front elevation view of an exemplary embodiment of a frame of a swing wall section of the present invention.
Figure 6:
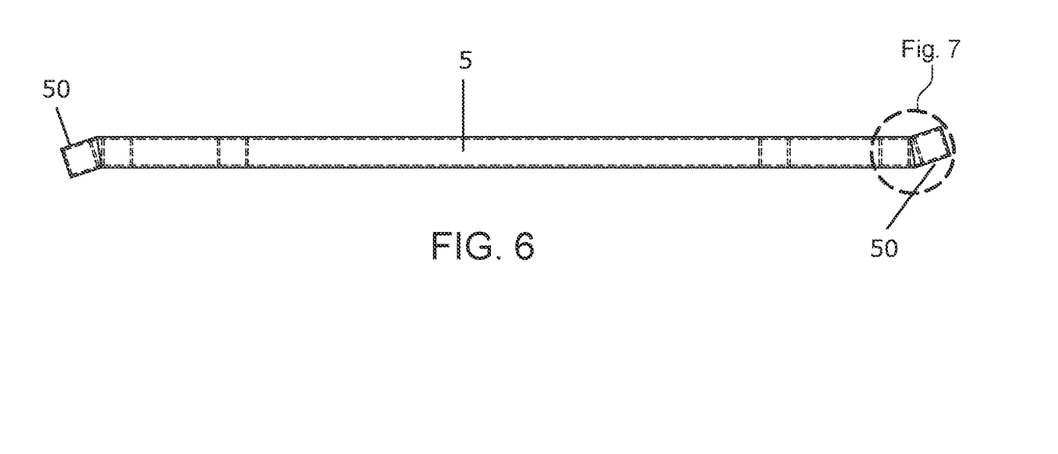
FIG. 6 is a top view of an exemplary embodiment of a header of the swing wall section of the present invention.
Figure 7:
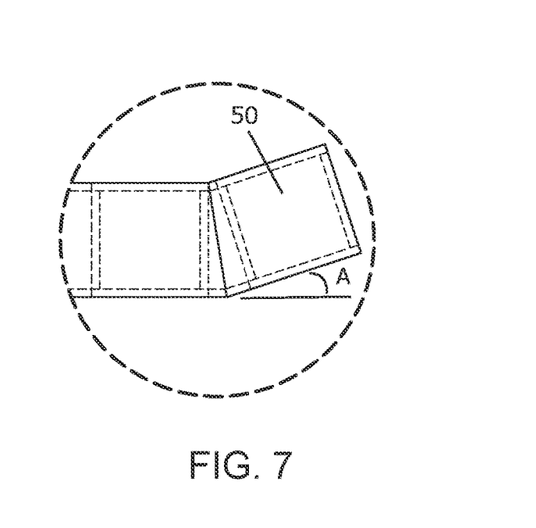
FIG. 7 is a detailed top view of an exemplary embodiment of an end of the present invention.
Figure 8:
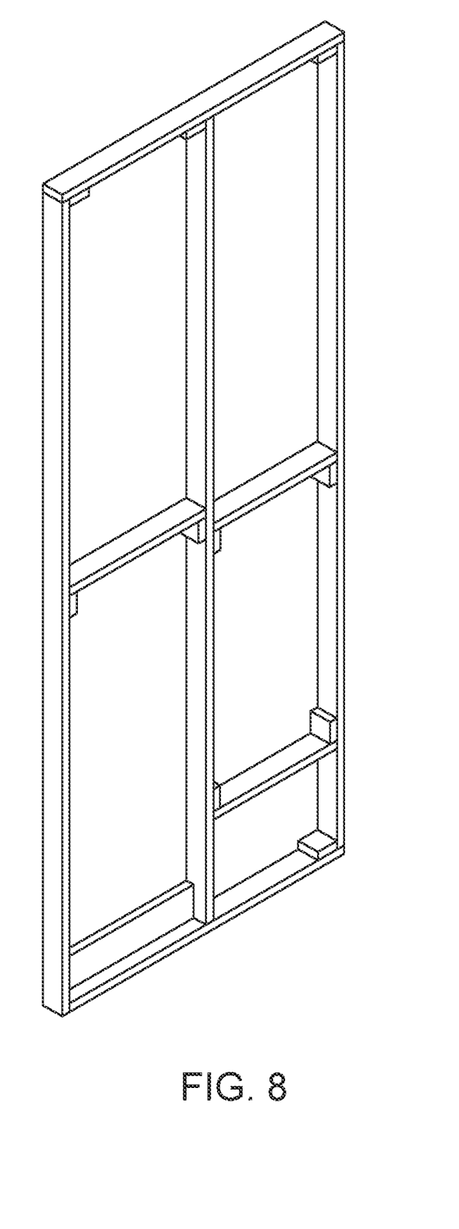
FIG. 8 is a perspective view of an exemplary embodiment of a pod wall of the swing wall section of the present invention.
Figure 9:
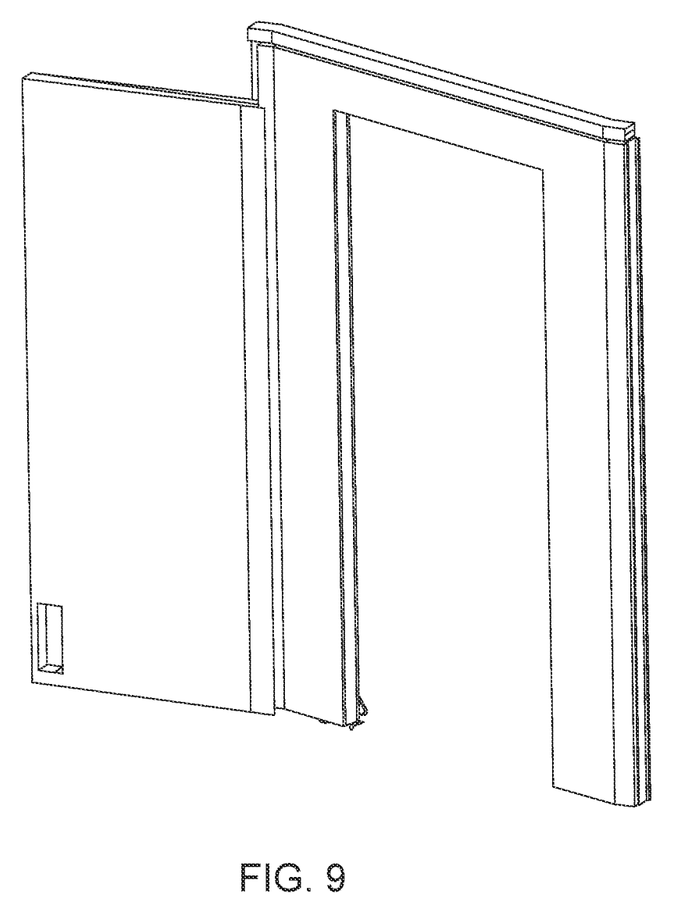
FIG. 9 is a perspective view of an exemplary embodiment of the present invention.
Figure 10:
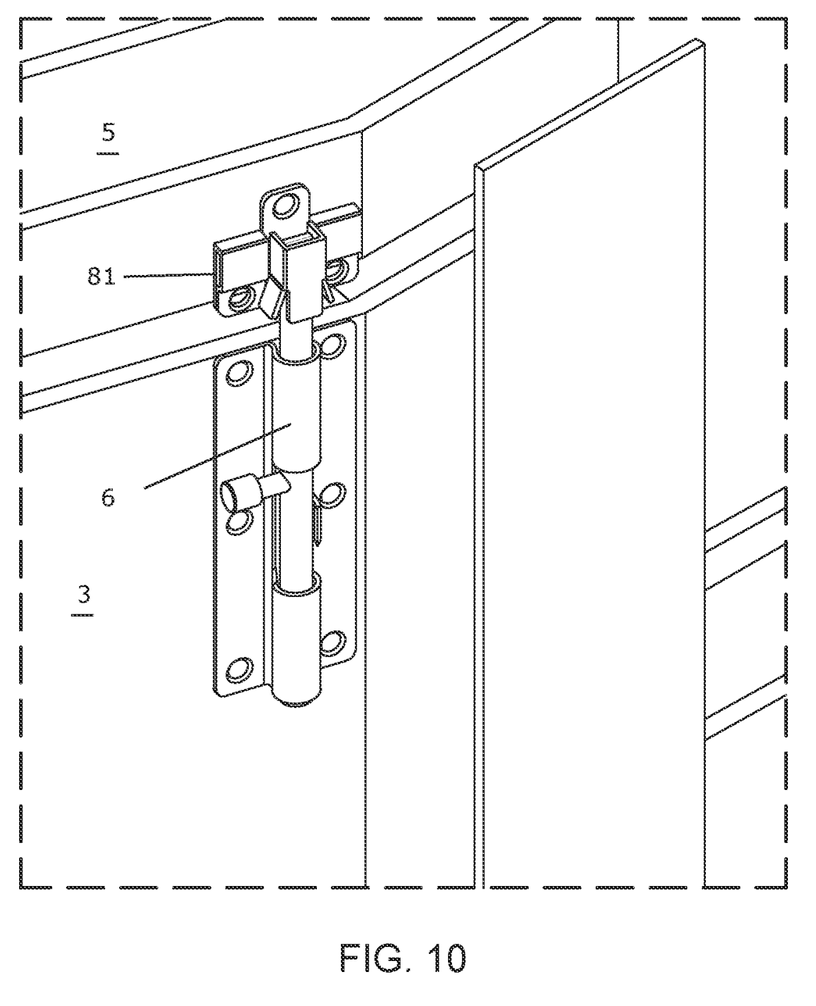
FIG. 10 is a detailed perspective view of an exemplary embodiment of a floor latch mechanism of the swing wall section of the present invention.
Figure 11:
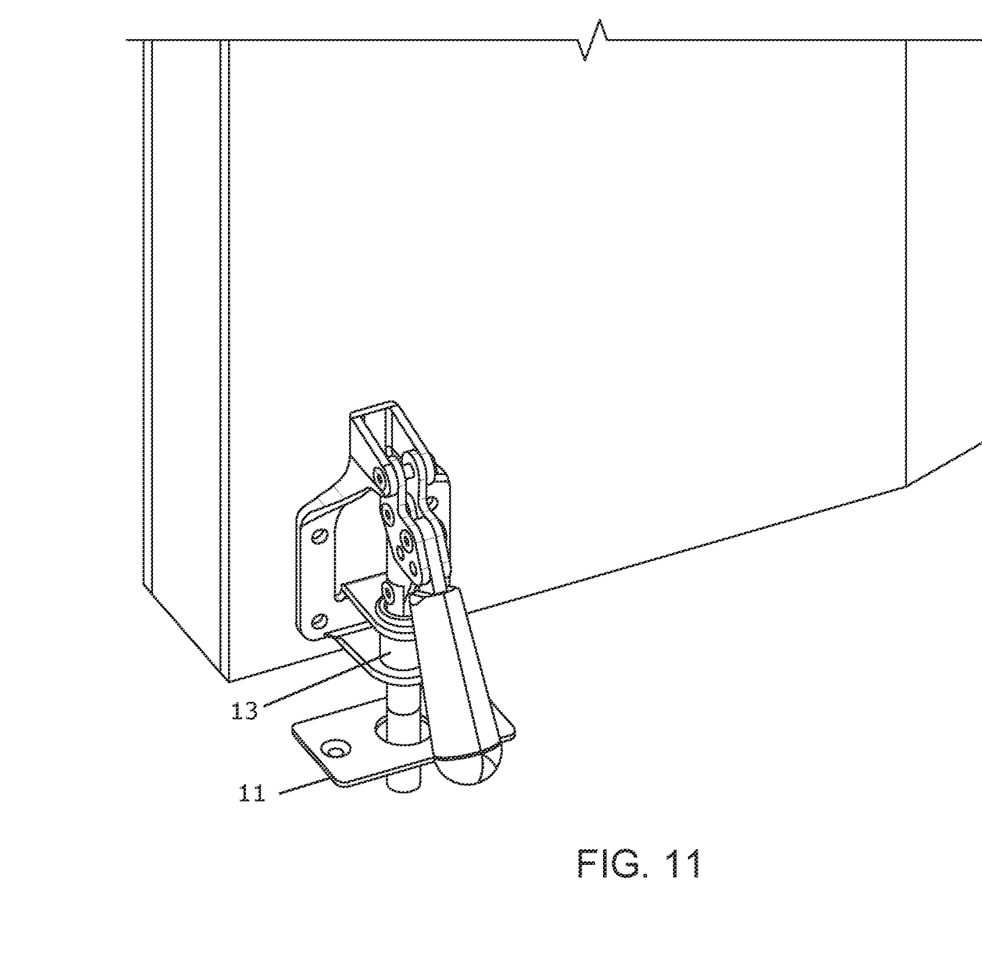
FIG. 11 is a detailed perspective view of an exemplary embodiment of a floor latch mechanism of the swing wall section of the present invention.

The wall header 5 has an angled portion 50 on each opposing end for facilitating the orientation of the swing wall 3 relative to the fixed wall 1 and a pod wall 9 along the second edge 32 of the swing wall. Each angled portion 50 may be oriented at an angle of incidence 'A' relative a longitudinal axis of the body of the header 5, as illustrated in FIG. 7, wherein the angle of incidence A may be between fifteen and twenty-five degrees. The header 5 and the swing wall 3 may be selectively joined by way of a self-aligning lock 6 movable between an unlatched and a latched condition engaging a strike plate 81 connected to the header 5.

The modular swinging wall assembly 100 may include a pod wall 9. The pod wall 9 may be built to fit after the fixed wall 1 and the swing wall 3. A base plate 11 may be connected to the supporting surface adjacent to the pod wall 9. The base plate 11 may have a stiffening plate joined perpendicular thereto to connect to and stabilize the pod wall 9. A second base plate 11 may provide a latch hole 111 for engaging a lower sliding lock 13 affixed to a lower portion of the pod wall 9. The lower sliding lock 13 may alternatively be affixed to a lower portion of the swing wall 3 so as to connect to the base plate 11.

A wheel 12 of a caster assembly 120 may be attached in the optimum location of the structural frame. The caster assembly 120 may include opposing mounting plates 4, a shaft collar 44 and the like.

The frame of the swing wall 3 may include frame elements 71-75 that define a cavity 76 that communicates with the supporting surface. The caster assembly 120 may attach via its mounting plates 4 to the framing of the swing wall 3 so as to be disposed in the cavity 76. With the caster assembly 120 being attached to the frame of the swing wall 3, the latter can be rolled around the supporting surface prior to or between installations with the space provided.

A method of assembling the present invention may include the following. An installer may assemble the wall sections 1, 3, and 9. In the location, the swing wall 3 may be wheeled to a desire location by way of the caster assembly 120. Then the installer may install the fixed wall 1, and then orient the swing wall 3 relative the fixed wall 1 with the geared hinge 2. The header 55 may be fixed by way of the self-aligning lock 6. Then the pod wall 9 may be attached to the second edge 32 by way of the flanges 7 and 8. Finally, the install may cover the entire assembly (front and back) with the wall covering and wall finish. The components may be reconfigured in size and location (i.e., a large wall versus a small wall, or swinging left versus swinging right).

Note, the framing covering is the "skin" shown covering the walls in the Figures—though it is not specifically called out—i.e., the frame cover are the large panels that are part of fixed wall 1, relocatable partition swing wall 3, optional fixed wall header 5, and pod wall 9. A standard commercial grade door—and PVC trim (not shown) may also be part of the assemblage.

A method of using the present invention may include the following. In a straightforward manner, using fasteners such as screws or rivets, the completed assembly may be mounted in an appropriate location to create a semi-permanent barrier between the normally open interior spaces inside an RV or specialty trailer. Latches should be adjusted to fit the opening for proper use.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A swing wall assembly for a recreational vehicle, the swing wall assembly comprising:
    a fixed wall pivotably connected to a first edge of a swing wall by way of a geared hinge configured so that a bottom elevation is elevated a caster distance relative a bottom elevation of the fixed wall;
    a caster assembly protruding from the bottom elevation of the swing wall; and
    a header connectable to an upper surface of the swing wall, wherein each end of the header comprises an angle portion.

2. The swing wall assembly of claim 1, wherein the angle portions have an angle of incidence relative to a longitudinal axis the header of between fifteen to twenty-five degrees.

3. The swing wall assembly of claim 2, further comprising a self-aligning lock interconnecting the header and an upper portion of the swing wall.

4. The swing wall assembly of claim 3, further comprising a pod wall connectable to a second edge of the swing wall by way of one or more flanges.

5. The swing wall assembly of claim 4, further comprising a sliding lock connected to a bottom portion of the pod wall or the swing wall, wherein the sliding lock moves to a locked engagement with a supporting surface of the swing wall assembly.

6. The swing wall assembly of claim 5, further comprising a doorway provided by the swing wall.

* * * * *